US008122666B2

(12) United States Patent
Gupta

(10) Patent No.: US 8,122,666 B2
(45) Date of Patent: Feb. 28, 2012

(54) INSULATING AND HEAT DISSIPATING PANELS

(76) Inventor: Vivek Gupta, Kingston (CA)

( * ) Notice: Subject to any disclaimer, the term of this patent is extended or adjusted under 35 U.S.C. 154(b) by 74 days.

(21) Appl. No.: 11/889,317

(22) Filed: Aug. 10, 2007

(65) Prior Publication Data

US 2008/0034698 A1 Feb. 14, 2008

Related U.S. Application Data

(60) Provisional application No. 60/836,694, filed on Aug. 10, 2006.

(51) Int. Cl.
*E04C 1/40* (2006.01)
(52) U.S. Cl. ........................ 52/508; 52/783.13; 52/302.3
(58) Field of Classification Search ............... 52/506.09, 52/506.02, 508, 302.3, 783.1, 783.13, 784.16, 52/795.1, 302.1, 302.2, 302.4, 302.5, 302.6, 52/302.7, 220.1; 454/254, 256, 260, 287
See application file for complete search history.

(56) References Cited

U.S. PATENT DOCUMENTS

| | | | | | |
|---|---|---|---|---|---|
| 5,664 | A | * | 7/1848 | Rodman | 237/50 |
| 802,871 | A | * | 10/1905 | Matton | 454/254 |
| 1,629,408 | A | * | 5/1927 | Peacock | 62/248 |
| 2,192,933 | A | * | 3/1940 | Saborsky | 52/302.3 |
| 2,251,660 | A | * | 8/1941 | Chipley | 454/108 |
| 2,318,820 | A | * | 5/1943 | Voigt et al. | 52/302.3 |
| 2,634,601 | A | * | 4/1953 | Tillery | 52/213 |
| 2,662,746 | A | * | 12/1953 | Jorn | 165/56 |
| 2,706,543 | A | * | 4/1955 | Kammerer | 52/455 |
| 2,861,447 | A | * | 11/1958 | Lieberman | 454/185 |
| 2,998,337 | A | * | 8/1961 | Tillotson | 52/406.1 |
| 3,318,056 | A | * | 5/1967 | Thompson | 52/105 |
| 3,343,323 | A | * | 9/1967 | Mayfield | 52/302.3 |
| 3,343,474 | A | * | 9/1967 | Sohda et al. | 454/185 |
| 3,439,601 | A | * | 4/1969 | Cooper | 454/198 |
| 3,748,803 | A | * | 7/1973 | Widerby et al. | 52/302.3 |
| 3,749,081 | A | * | 7/1973 | Wilson | 126/200 |
| 3,783,569 | A | * | 1/1974 | Roussin | 52/480 |
| 4,000,595 | A | * | 1/1977 | Fortescue | 52/302.3 |
| 4,147,004 | A | * | 4/1979 | Day et al. | 52/309.9 |
| 4,241,555 | A | * | 12/1980 | Dickens et al. | 52/454 |
| 4,259,820 | A | * | 4/1981 | Kita et al. | 52/302.3 |
| 4,271,219 | A | * | 6/1981 | Brown | 428/116 |
| 4,286,420 | A | * | 9/1981 | Pharmakidis | 52/404.1 |
| 4,291,079 | A | * | 9/1981 | Hom | 428/116 |
| 4,295,415 | A | * | 10/1981 | Schneider, Jr. | 454/185 |
| 4,439,960 | A | * | 4/1984 | Jenkins | 52/99 |
| 4,449,341 | A | * | 5/1984 | Taglianetti et al. | 52/235 |

(Continued)

*Primary Examiner* — William V Gilbert
*Assistant Examiner* — James Ference
(74) *Attorney, Agent, or Firm* — Dowell & Dowell, P.C.

(57) ABSTRACT

Panels that provide structural integrity to building structures and enhance the insulation and heat dissipation capacity of a structure. The panels include an inner imperforate rigid layer of a first material, an outer rigid layer of a second material, and at least one intermediate rigid layer of a third material. The layers are positioned in a spaced relationship so that there are a first air space between the inner layer and the intermediate layer and a second air space between the intermediate layer and the outer layer. At least one pair of upper and lower openings are provided in the outer layer so that the second air space communicates with ambient air. Likewise, the intermediate layer includes at least one pair of upper and lower openings that communicate with the openings in the outer layer so that the first air space is also in fluid communication with the ambient air.

17 Claims, 13 Drawing Sheets
(4 of 13 Drawing Sheet(s) Filed in Color)

U.S. PATENT DOCUMENTS

| | | | |
|---|---|---|---|
| 4,492,064 A * | 1/1985 | Bynoe | 52/309.8 |
| 4,615,381 A * | 10/1986 | Maloney | 165/48.2 |
| 4,784,902 A * | 11/1988 | Crompton | 442/373 |
| 5,119,612 A * | 6/1992 | Taylor et al. | 52/410 |
| 5,218,798 A * | 6/1993 | Bentivegna et al. | 52/206 |
| 5,347,779 A * | 9/1994 | Jordan | 52/302.3 |
| 5,491,945 A * | 2/1996 | Meirick | 52/309.11 |
| 5,561,958 A * | 10/1996 | Clement et al. | 52/407.1 |
| 5,598,673 A * | 2/1997 | Atkins | 52/302.1 |
| 5,758,463 A * | 6/1998 | Mancini, Jr. | 52/309.12 |
| 5,761,864 A * | 6/1998 | Nonoshita | 52/302.3 |
| 5,799,454 A * | 9/1998 | Andersson et al. | 52/302.3 |
| 5,822,940 A * | 10/1998 | Carlin et al. | 52/479 |
| 6,061,978 A * | 5/2000 | Dinwoodie et al. | 52/173.3 |
| 6,101,775 A * | 8/2000 | Larimore | 52/302.1 |
| 6,250,029 B1 * | 6/2001 | Jeffers et al. | 52/220.7 |
| 6,615,544 B1 * | 9/2003 | Tlemcani et al. | 49/7 |
| 6,745,531 B1 * | 6/2004 | Egan | 52/302.1 |
| 6,754,997 B2 * | 6/2004 | Bonin | 52/220.1 |
| 6,883,590 B1 * | 4/2005 | Messana | 165/56 |
| 7,018,699 B2 * | 3/2006 | Dykhoff | 428/76 |
| 7,117,649 B2 * | 10/2006 | Morris et al. | 52/302.3 |
| 7,393,577 B2 * | 7/2008 | Day et al. | 428/121 |
| 7,818,922 B2 * | 10/2010 | Ellis | 52/95 |
| 2003/0084627 A1 * | 5/2003 | Bonin | 52/220.1 |
| 2006/0123724 A1 * | 6/2006 | Pollack | 52/302.1 |

* cited by examiner

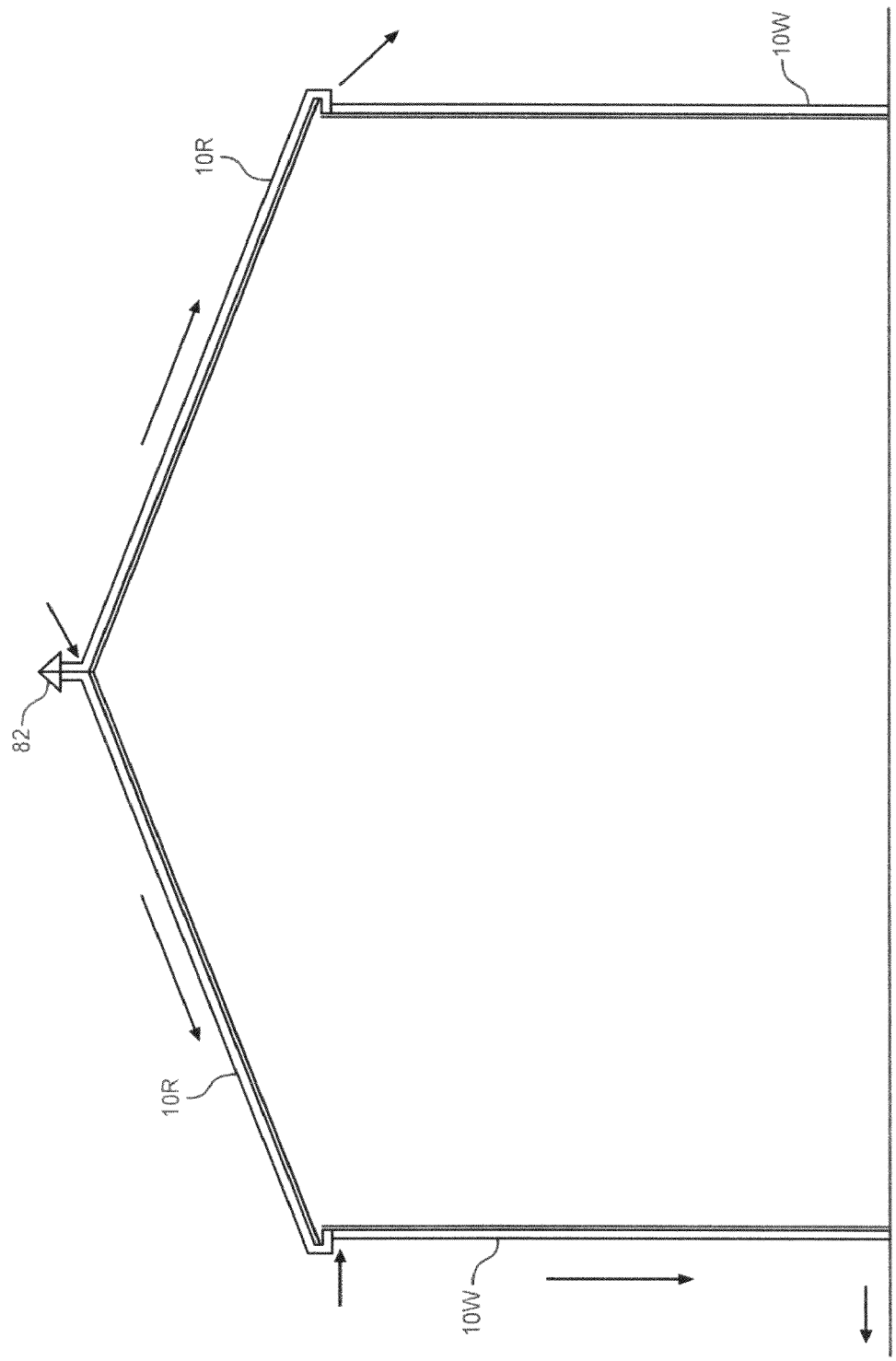

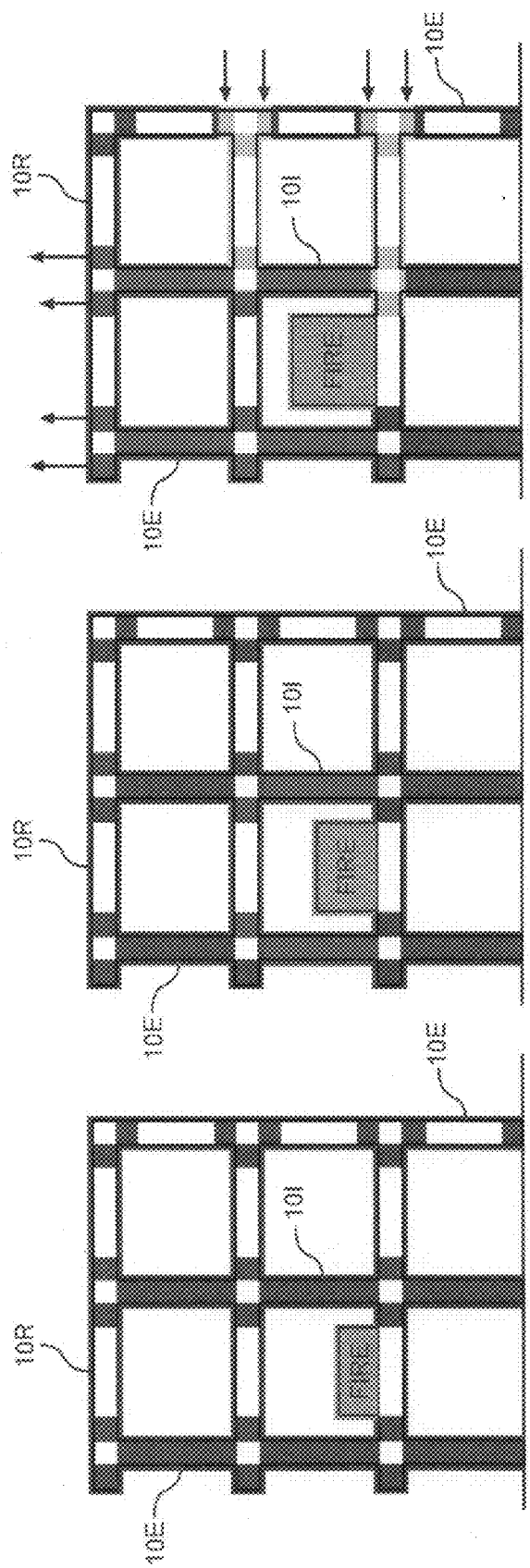

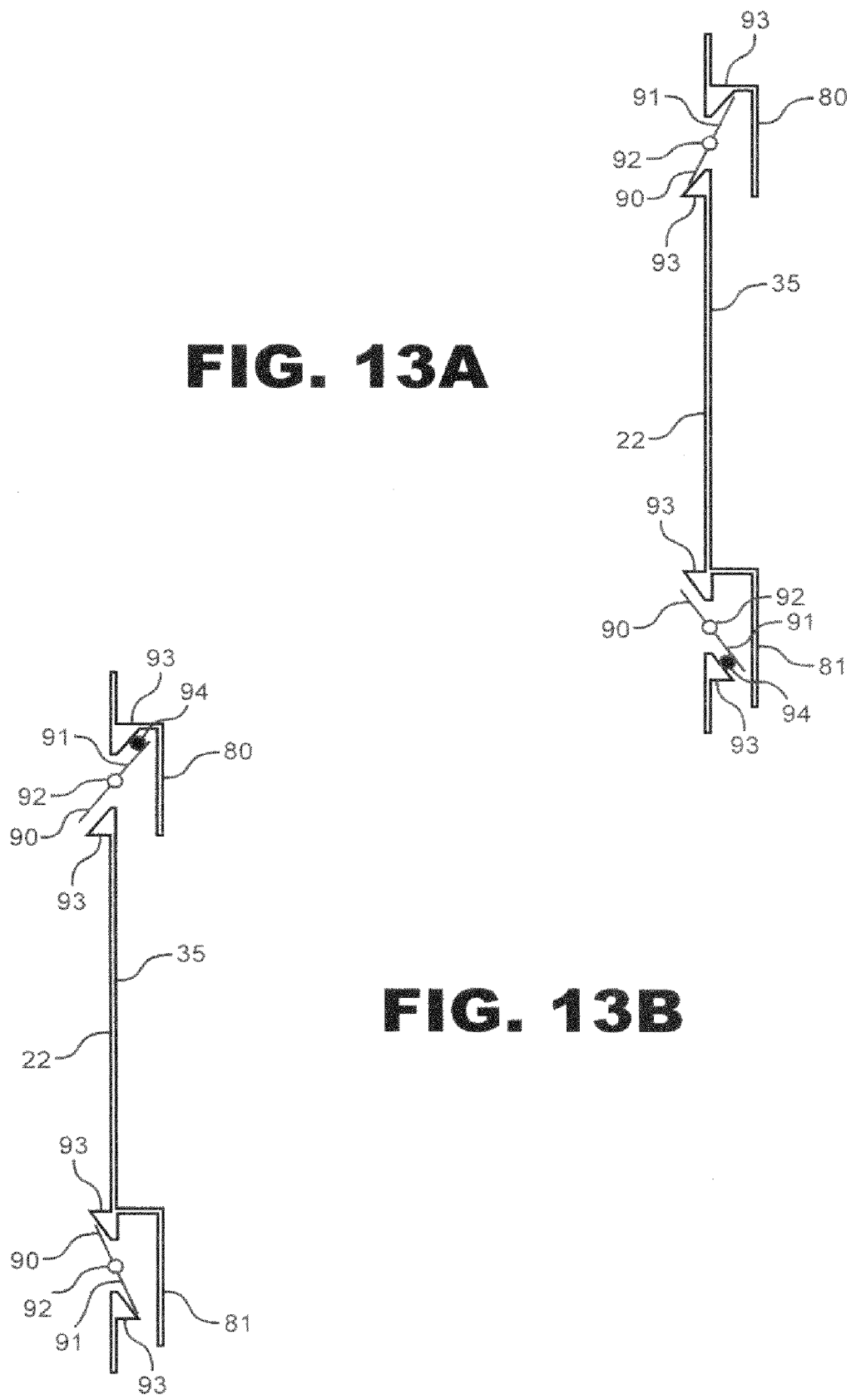

INSULATING AND HEAT DISSIPATING PANELS

CROSS-REFERENCE TO RELATED APPLICATIONS

This application claims priority to U.S. provisional patent application No. 60/836,694 to Vivek Gupta, entitled "Insulating and Heat Dissipating Panels" and filed on Aug. 10, 2006, which is hereby incorporated by reference in its entirety.

BACKGROUND OF THE INVENTION

1. Field of the Invention

This invention is directed to structural panels that may be used in single or multiple story building construction, including both commercial and residential, and wherein the panels are designed and constructed to convey and conduct ambient heat and radiant energy away from an interior of a building when the ambient temperature increases, while reducing internal heat dissipation when the ambient temperature drops, and wherein the same panels may be used to dissipate heat from interior fires to the exterior of the building in a manner that will help prevent melting and destruction of interior supporting metal girders, posts and beams.

2. Brief Description of the Related Art

Various types of panels have been designed and constructed to provide insulation properties to a structure. Many such panels have outer solid surfaces between which insulating materials are retained, including conventional fiberglass materials or insulating foams. In some instances, dead air spaces may also be provided within the panels to further reduce heat convection and conduction through the panels. In some of these prior art panels, outer surfaces may include cementitious or plastic resin layers or coatings to not only provide additional insulation properties but also to enhance the design appearance of a structure.

Unfortunately, many prior art insulating panels used in the construction industry do not provide both structural strength and good thermal conductive properties. Further, these prior art panels are often flammable. In view of this, there is a need to develop strong, inflammable panels that can be used in essentially all building structures wherein the panels also channel and dissipate heat energy to not only reduce the effect of ambient temperature and radiant energy conditions that might adversely affect temperatures within a building but to also dissipate interior heat caused by fires in such a manner to protect the complete destruction of interior beams, girders, joists, posts and the like.

SUMMARY OF THE INVENTION

The present invention is directed to inflammable, insulating panels that are constructed in such a manner as to provide structural strength and integrity of building structures in which they are used and that also provide unique thermal conductive properties to enhance the insulation and heat dissipation capacity of a structure.

In this respect, the panels are formed including an inner imperforate rigid layer of a first material, an outer rigid layer of a second material, and at least one intermediate rigid layer of a third material. The layers are positioned in a spaced relationship so that there are an open air space between the inner layer and the intermediate layer and another open air space between the intermediate layer and the outer layer.

A covering material covers and extends along an outer surface of the outer rigid layer. At least one pair of upper and lower openings are provided in the upper and lower portions of the outer layer so that the open air space between outer rigid layer and the intermediate layer communicates with ambient air.

Likewise, the at least one intermediate layer includes at least one pair of upper and lower openings that communicate with the upper and lower openings in the outer layer so that the space between the at least one intermediate layer and the inner layer is also in fluid communication with the ambient air.

It is a primary object of the invention to provide heat dissipating insulation panels that can be selectively constructed to exhibit differing heat convective characteristics depending upon the anticipated use and environment in which the panels are to be used such that the number of layers may be varied to optimize fire protection or to protect from solar heating or to reduce internal heat dissipation by radiation and/or convection to the surrounding environment.

BRIEF DESCRIPTION OF THE DRAWINGS

The patent or application file contains at least one drawing executed in color. It is understood that copies of this patent or patent application publication with color drawing(s) will be provided by the Office upon request and payment of the necessary fee. A better understanding of the invention will be had with reference to the accompanying drawings wherein:

FIG. 10 is an illustrational view showing air flow caused by a decrease in ambient temperature for a building constructed with the insulating panels of the invention;

FIGS. 11A-C are illustrational views showing air flow caused by a fire in a multistory building constructed with the insulating panels;

FIG. 13A is a side view of an outer layer of an insulating panel of the invention having valves located in the openings of the layer and positioned for promoting air flow through the panel when the ambient temperature is increasing; and FIG. 13B is a side view of an outer layer of an insulating panel of the invention having valves located in the openings of the layer and positioned for promoting air flow through the panel when the ambient temperature is decreasing.

DESCRIPTION OF THE PREFERRED EMBODIMENTS

Figure 1:
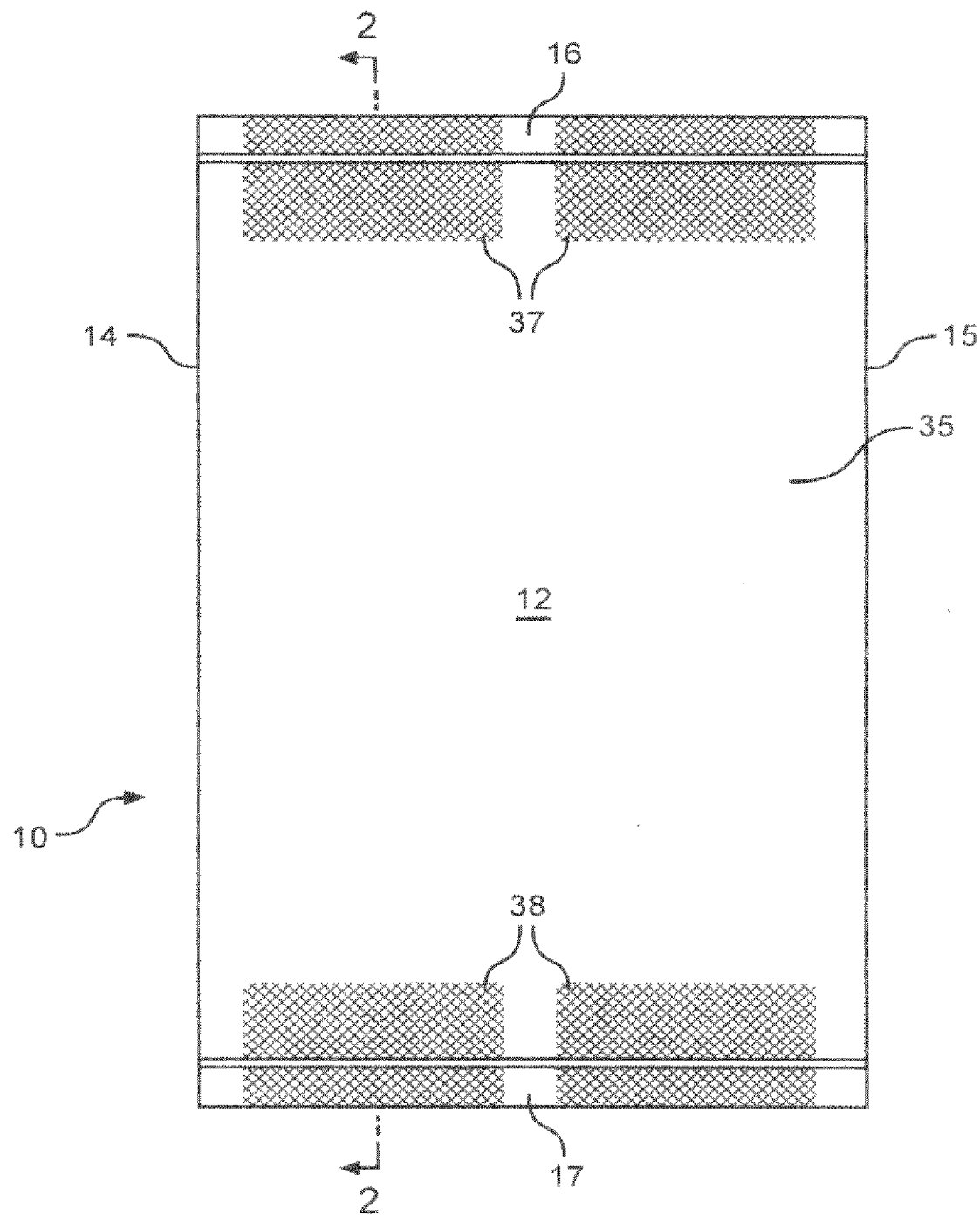
FIG. 1 is an elevational view of an insulating panel in accordance with the teachings of the invention.
Figure 2:
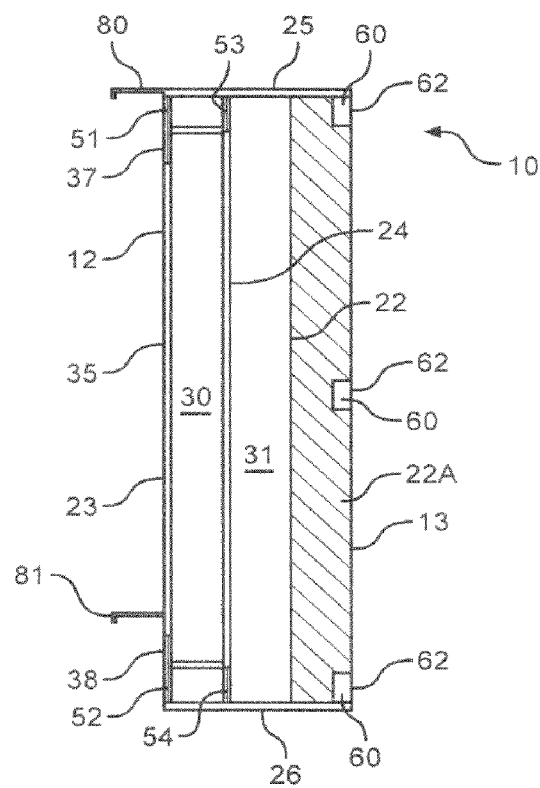
FIG. 2 is a side view of the insulating panel taken along line 2-2 in FIG. 1.

With continued reference to the drawing figures, insulated panels 10 of the present invention are constructed in such a manner to not only provide structural strength for increasing the structural integrity of a building structure in which they are used, but also to provide unique thermal conductive and conveying properties to enhance the insulation and heat dissipation capacity of walls and roofing structures of a building. As shown in FIGS. 1 and 2, the panels 10 include front and rear surfaces 12 and 13, opposite side edges 14 and 15, and upper and lower portions 16 and 17, respectively. The sizes of the panels 10 may vary depending upon the anticipated area of use. Normally, the panels 10 are structured to conventional building dimensions, such as 4'×8' with a thickness of approximately one inch. Other dimensions, such as 4'×9' or 10', may also be used.

As shown in FIG. 2, each panel 10 includes an inner imperforate rigid layer 22 of a first material, an outer generally imperforate and rigid layer 23 of a second material, and at least one intermediate, generally imperforate and rigid layer 24 of a third material. In the preferred embodiment, the inner rigid layer 22 is not a solid layer, but rather an enclosed box of static air, other gas, or insulation and/or sound proofing material(s). Further, the enclosed box structure of the inner layer 22 can include an insert 22a to create capillary width vertical air layers within the inner rigid layer 22, as illustrated in FIG. 2. The box structure could be formed of a group of materials consisting of glass, metals, plastics and plastic resins, graphite, ceramics, wooden, cementitious materials, and any combination thereof. In alternative embodiments, the inner layer 22 can be made from a solid material and have a substantially greater cross sectional dimension than the other layers 23 and 24. In other embodiments, the inner rigid layer 22 may also be a load-bearing layer.

In some embodiments, the material of the layers 22, 23, and 24 may be the same, while in other embodiments, the layers 22, 23, and 24 will be formed of different materials. The first, second and third materials of the layers 22, 23, and 24, respectively, may be formed of a group of materials consisting of glass, metals, plastics and plastic resins, graphite, ceramics, wooden, cementitious materials, and the like, and any combination thereof. In some embodiments, at least the one intermediate layer 24 may be formed of a fire retardant material to provide for increased fire safety.

The layers 22, 23, and 24 are joined in a spaced relationship with each other by upper and lower plates 25 and 26, respectively. The plates 25 and 26 are formed of compatible materials that can be adhered to the upper and lower ends 16 and 17 of the layers of the panel 10. In the embodiment shown in FIG. 2, the outer rigid layer 23 and the intermediate layer 24 are positioned so that there is a first air space 30 between them. Likewise, the intermediate layer 24 and the inner rigid layer 22 are positioned so that there is a second air space 31 between them.

In a preferred embodiment, a covering material or coating 35 substantially covers the outer layer 23 and extends along the front surface 12 of the panel 10 for decorative purposes. The covering material 35 is selected to obtain a desired or predetermined architectural appearance and will thus vary depending on the intended use. The covering material 35 may be a wood or plastic veneer, plastic resin or blend with aggregates or rock or stone, or other cementitious materials. Further, the covering material 35 includes at least one pair of upper and lower openings 37 and 38, which are adjacent the upper and lower portions 16 and 17, respectively, of the panel 10.

Another at least one pair of upper and lower openings 51 and 52, respectively, are provided in the outer rigid layer 23 adjacent the upper and lower portions 16 and 17, respectively, of the panel 10. The upper and lower openings 51 and 52, respectively, in the outer layer 23 communicate with the upper and lower openings 37 and 38, respectively, in the covering material 35 and with the air space 30 so that the air space 30 is in fluid communication with the ambient air outside the outer covering material 35 of the panel 10. Further, the openings 51 and 52 in the outer layer 23 and the openings 37 and 38 in the covering material allow ambient air to contact the surface of the at least one intermediate layer 24.

As shown in FIG. 2, the intermediate layer 24 also includes a pair of upper and lower openings 53 and 54, respectively. The upper and lower openings 53 and 54, respectively, in the intermediate layer 24 cooperate with the upper and lower openings 51 and 52, respectively, in the outer layer 23, as well as the upper and lower openings 37 and 38, respectively, in the covering material 35, so that the ambient air is also in fluid communication with air in the space 31.

Figure 1A:
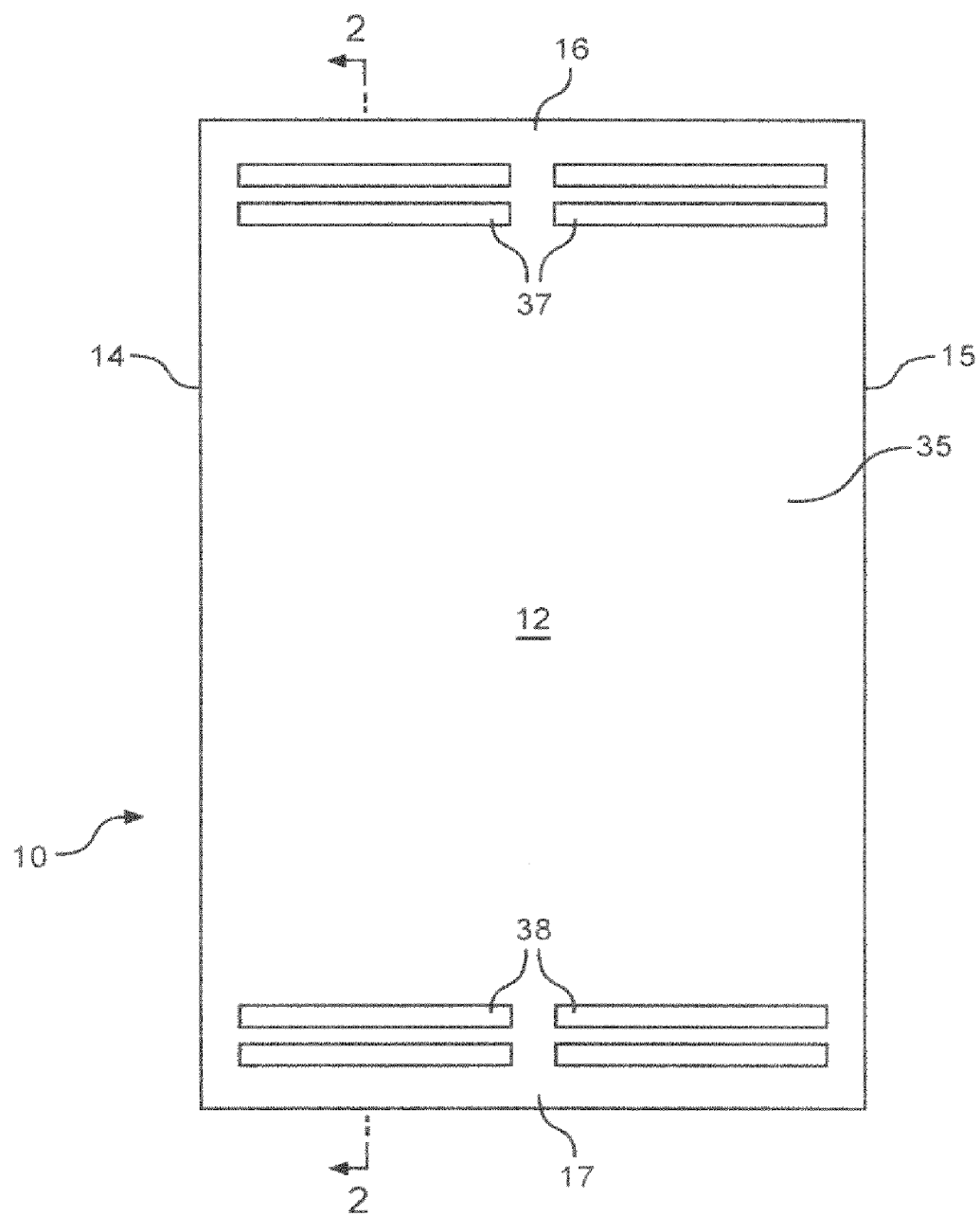
FIG. 1A is an alternative embodiment of the insulating panel shown in FIG. 1.
Figure 2A:
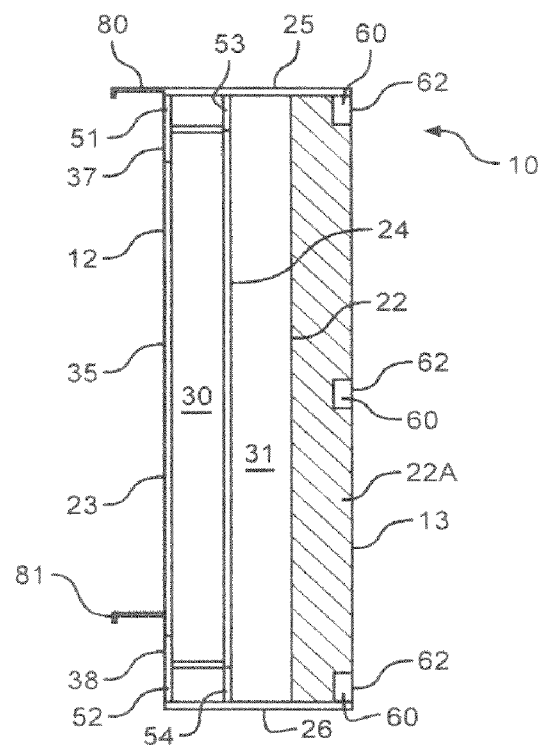
FIG. 2A is a side view of the insulating panel taken along line 2-2 in FIG. 2A.

An alternative embodiment of the insulating panel 10 is shown in FIGS. 1A and 2A. In this embodiment, the upper and lower openings 37 and 38 in the covering material have an elongated rectangular shape. Similarly, the upper and lower openings 51 and 52 in the outer rigid layer 23 and the upper and lower openings 53 and 54 in the intermediate layer 24 also have an elongated rectangular shape. Thus, in this embodiment, the upper and lower openings in the covering material 35, the outer rigid layer 23, and the intermediate layer 24 comprise a few elongated openings, as opposed to a plurality of perforations. In addition to the embodiment shown in FIGS. 1 and 2 and the embodiment shown in FIGS. 1A and 2A, the size and the shape of the openings may vary. Further, the openings may be selectively covered, such as when the panels 10 are not being used.

Figure 3:
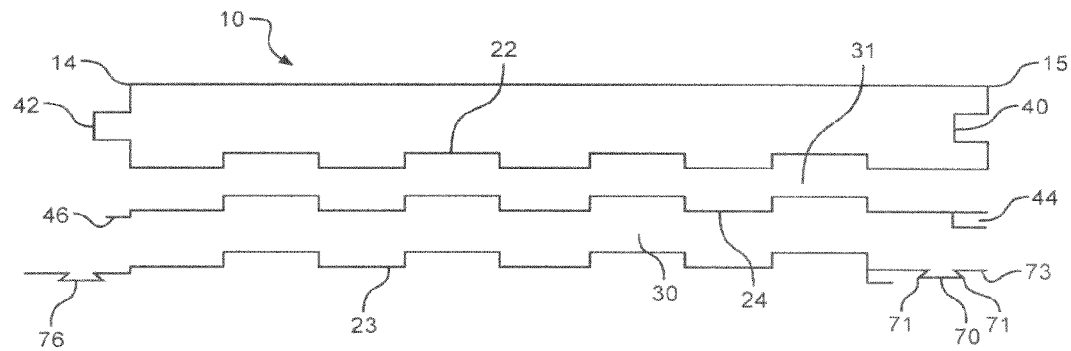
FIG. 3 is a top view of another embodiment of the insulating panel.

As opposed to connecting the layers by the plates shown in FIGS. 2 and 2A, the layers may be joined in spaced relationship with respect to one another by appropriate mechanical fasteners. In one embodiment of the invention, the inner, outer and at least one intermediate rigid layers, 22, 23, and 24, respectively, of the insulating panel 10 may have at least one or two opposing corrugated faces for reinforcement, as shown in FIG. 3. The actual shape of the corrugations may change depending on design and strength requirements, such as to be more V-shaped or C-shaped.

To further facilitate the manner in which the panels 10 are erected, each panel 10 includes means for connecting each layer of the panel 10 to the corresponding layer of an adjacent panel. Thus, the panels can be erected layer by layer. To connect the inner rigid layers 22 of two adjacent panels, the side edges 14 and 15 of each panel 10 may include interlocking male and female portions that are formed integrally therewith. As shown in FIG. 3, the side 15 of the panel 10 is formed having an elongated slot 40, while the opposite side 14 has an elongated locking flange 42 extending therefrom. The flange 42 is of a size to be frictionally received within the slot 40 of an adjacent panel when the panels are assembled in side-by-side relationship. An appropriate adhesive may be used to bond the flanges 42 within the slots 40.

To connect the at least one intermediate layer of each of the panels 10, the side edges 14 and 15 of each panel 10 may likewise include interlocking male and female portions that are formed integrally therewith. As shown in FIG. 3, the side 15 of the panel 10 is formed having a narrow slot 44, while the opposite side 14 has an elongated locking tab 46 extending therefrom. The tab 46 is of a size to be frictionally received within the narrow slot 44 of an adjacent panel when the panels are assembled in side-by-side relationship. An appropriate adhesive may be used to bond the flanges 44 within the slots 46.

To further secure the panels 10 to one another, the outer rigid layer 22 may include a vertically extending locking projection 70 having opposite oriented side flanges 71 and 72 extending from a front face 73 thereof and adjacent one of the side edges 15 thereof. The projection 70 is engage able by at least one shaped mechanical fastening clip-like member 76 having a cooperating profile that extends from an adjacent panel for also securing the adjacent panels in side-by-side relationship. The member 76 not only locks the panels together but also forms a protective covering for the joint between adjacent panels that prevents moisture and other contaminants from penetrating the joint area.

Figure 4:
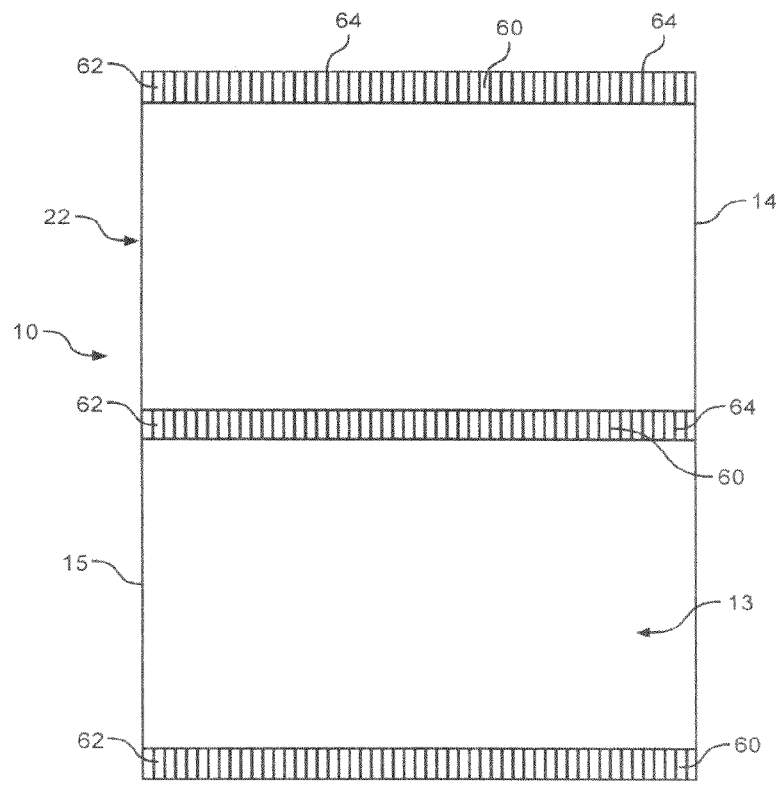
FIG. 4 is a rear elevational view of the panel shown in FIG. 1.

With reference to FIG. 4, the rear surface 13 of the panel 10 includes two or more spaces 60, over which are placed grill structures 62. The grill structures 62 have a series of members or elements 64 that may be selectively engaged by mechanical fasteners that may be used to secure the panels 10 to building components such as beams, elevator shafts, posts, girders, wall studs, roofing trusses, and the like.

As previously described, the layers of the panels 10 may be formed of differing materials depending on the anticipated end use. By way of example, a panel may have all three layers formed of glass such that the panel may be used as an insulated window or skylight. Other panels may include an intermediate fire retardant layer that includes a material such as a graphite that is sandwiched between inner and outer galvanized metallic layers. For maximum strength and rigidity, in some instances all the layers may be formed of heat conductive iron or other metallic materials. As noted, the panels of the invention are not limited for use as wall panels but may be used as finished roofing components, girder panels, and the like.

As described, the panel 10 can be selectively constructed to exhibit differing heat convection and conduction properties to optimize fire protection or to protect from solar heating or to reduce internal heat dissipation by radiation and/or convection to the surrounding environment. Accordingly, as the ambient temperature increases, the panel 10 can dissipate additional heat to keep the interior layer of the panel 10 cool, as illustrated in FIGS. 5A-E.

Figure 5:
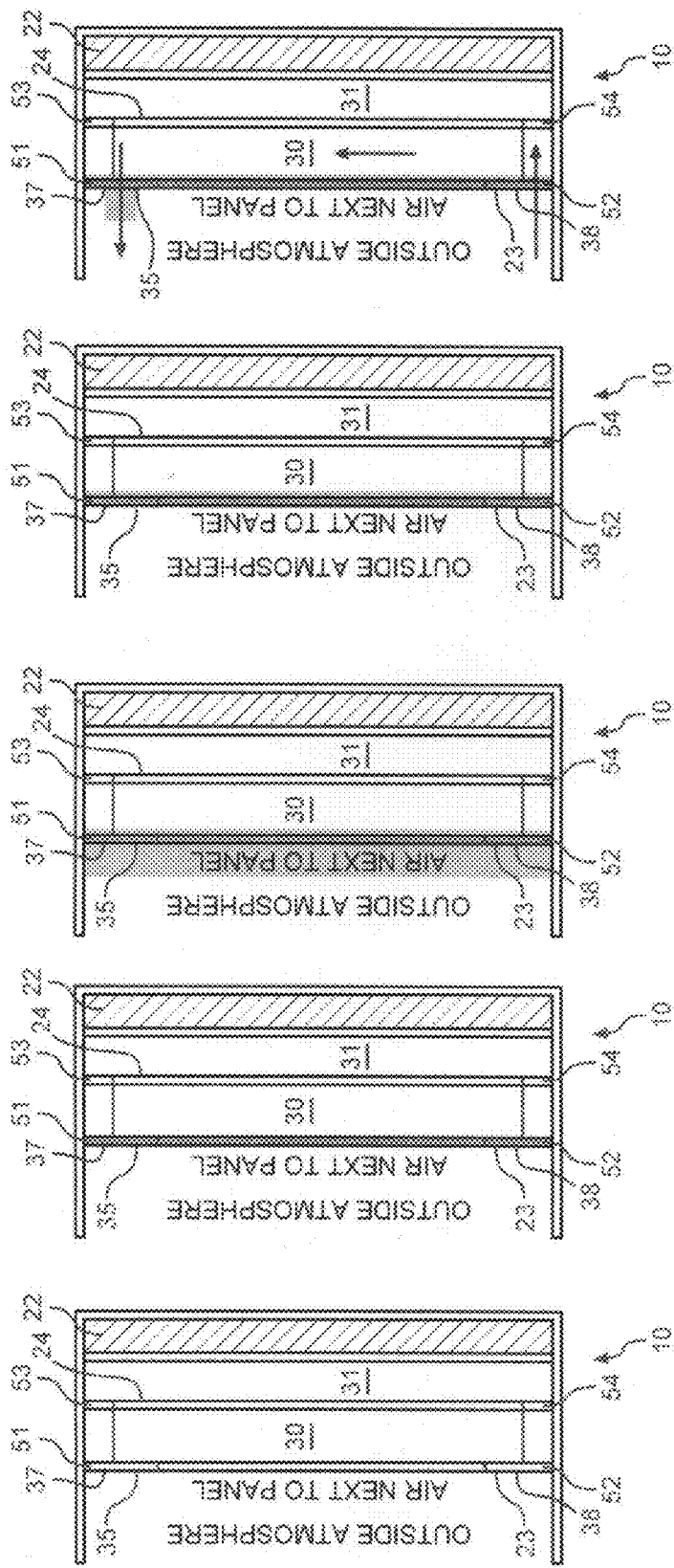
FIGS. 5A-E are side views of the insulating panel showing how the panels dissipates heat as ambient temperature increases.

FIG. 5A shows the insulating panel 10 at ambient temperature. When the ambient temperature increases by some value DT, the exterior surface of the outer rigid layer 23 starts to heat before the air enclosed in the space 30 gets warmer, as shown in FIG. 5B. As the temperature of the outer layer 23 continues to increase, a layer of air adjacent to the outer layer 23 in the space 30 and a thin layer of ambient air adjacent the outer layer 23 get warm via conduction and convection, as illustrated in FIG. 5C.

While the thin layer of ambient air initially increases in temperature, the outside atmosphere soon assimilates the temperature of this layer back to ambient temperature, as shown in FIG. 5D. While the temperature of the ambient air layer is normalized, the temperature of the air within the space thirty continues to increase. As the layer of air in the space 30 increases in temperature, it expands. As the air expands, it becomes less dense. As a result, the warmer air in the space 30 rises and moves upwardly within the panel 10. The warmer air continues to rise until it leaves the panel 10 via the cooperating upper openings 51 and 37 in the outer panel 23 and the covering material 35, respectively, while ambient air enters the panel 10 through the cooperating lower openings 52 and 38, as shown in FIG. 5E.

Further, some residual heat from the warm air in the space 30 will make the surface of the intermediary layer 24 warm. As the temperature of the intermediate layer 24 continues to increase, air within the space 31 gets warmer. This warm air begins to rise and moves upwardly within the panel 10. The warmer air continues to rise until it leaves the panel 10 via the upper openings 53 in the intermediate layer 24 and passes through the cooperating upper openings 51 and 37 in the outer panel 23 and covering material 35, respectively, to the exterior of the panel 10. Thus, as a result of its structure, the panel 10 can effectively dissipate heat to keep the interior of the panel 10 cool, even in light of exterior temperature increases due to weather, radiant effects, or fire. As air is dissipated from the openings 37, 51, and 53, cooler air enters the lower openings 38, 52, and 54 into the open air spaces 30 and 31 to provide a cooling effect.

Figure 6:
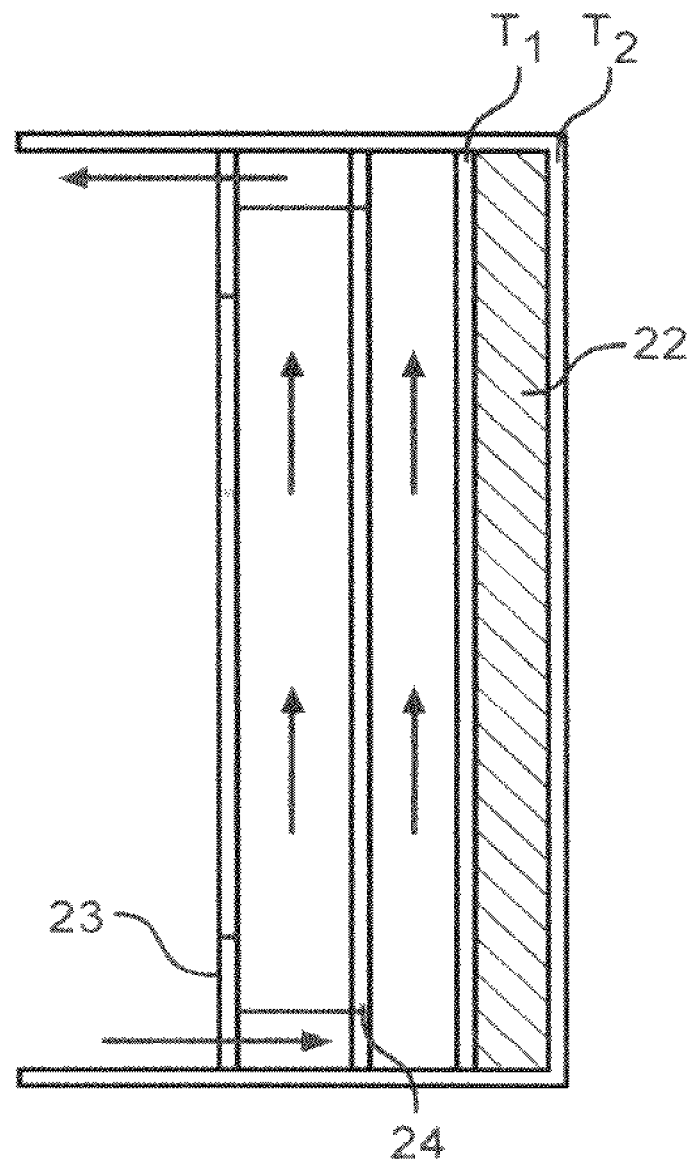
FIG. 6 is a side view of the insulating panel showing the temperature differential created by the panel.

As set forth above, the insulating panel 10 is designed to utilized the heat transfer principles of convection and conduction to essentially eliminate the need for air condition. According to Fourier's Law for calculating heat flux ($q''_x$):

$$q''_x = -K(T_2 - T_1)/L$$

wherein $T_1$ is the temperature of the air adjacent an outside surface of the inner layer 22, $T_2$ is the air temperature adjacent an inside surface of the inner layer 22, K is the thermal conductivity of air, and L is the thickness of the layer. With reference to FIG. 6, since the openings in the outer panel 23 and the intermediate panel 24 allow air to circulate through the panel 10, convection currents keep the rising ambient temperature away from $T_1$ for an extended period of time. Accordingly, the rate of heat transfer will not increase for that period of time, and the panel 10 effectively maintains the interior temperature $T_2$.

Figure 7:
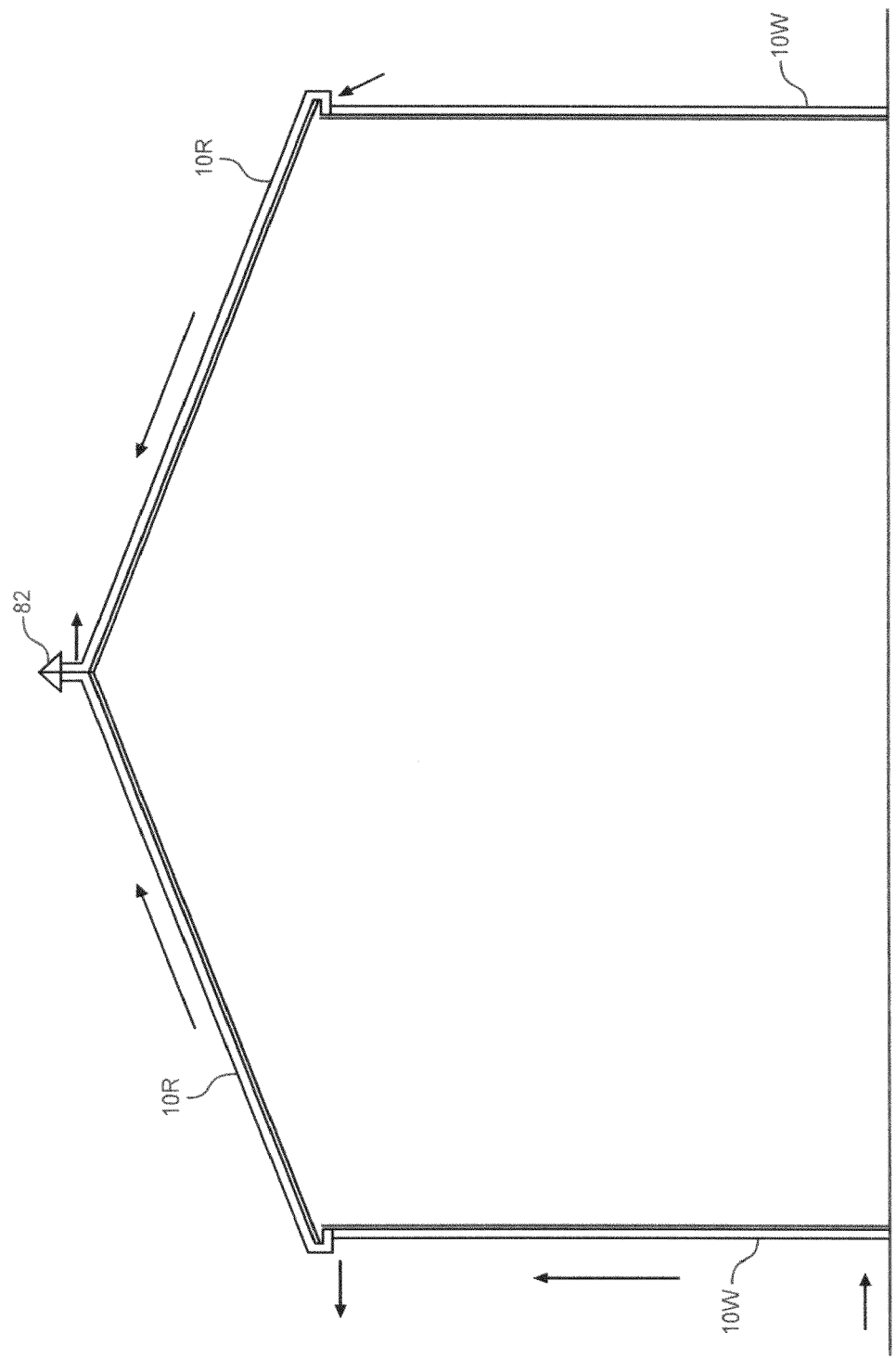
FIG. 7 is an illustrational view showing air flow caused by an increase in ambient temperature for a building constructed with the insulating panels of the invention.

The insulating panels 10 can be used in a variety of applications in buildings. The panels 10 are not only useful as wall panels, but the panels 10 may be used as finished roofing components, girder panels, and the like. FIG. 7 illustrates a building constructed out of insulating panels 10. The panels 10W form the walls of the building, and the insulating panels 10R form the roof. As shown in FIG. 7, the ambient air enters the bottoms of the panels 10W and 10R and exits the tops of the panels 10W to 10R in furtherance of the heat transfer scheme set forth above.

In addition to dissipating exterior heat, the panel 10 can also serve as an insulator to keep a structure from losing heat when the ambient temperature drops, as shown in FIGS. 8A-E. FIG. 8A shows the insulating panel 10 at ambient temperature. When the ambient temperature decreases by some value DT, the exterior surface of the outer rigid layer 23 gets colder before the air enclosed in the space 30 becomes, as shown in FIG. 8B. As the temperature of the outer layer 23 continues to decrease, a layer of air adjacent to the outer layer 23 in the space 30 and a thin layer of ambient air adjacent the outer layer 23 get cooler via conduction and convection, as illustrated in FIG. 8C.

While the thin layer of ambient air initially decreases in temperature, the outside atmosphere soon assimilates the temperature of this layer back to ambient temperature, as shown in FIG. 8D. While the temperature of the ambient air layer is normalized, the temperature of the air within the space thirty continues to decrease. As the layer of air in the space 30 decreases in temperature, it contracts. As the volume of the air gets smaller, the layer of air becomes denser. As a result, the cooler air in the space 30 sinks and moves downwardly along the panel 10. The cooler air continues to sink until it leaves the panel 10 via the cooperating openings 52 and 38 in the outer panel 23 and in the covering material 35, respectively, while ambient air enters the panel 10 through the cooperating upper openings 51 and 37, as shown in FIG. 8E.

Further, the colder air in the space 30 will make the surface of the intermediary layer 24 cooler. As the temperature of the intermediate layer 24 decreases, a layer of air adjacent to the intermediate layer 24 in the space 31 gets colder. This layer of cool air begins to sink and moves downwardly along the panel 10. The cooler air continues to sink until it leaves the panel 10 via the lower opening 54 in the intermediate layer 24 and passes through the cooperating lower openings 52 and 38 in the outer panel 23 and in the covering material 35, respectively, to the exterior of the panel 10. As air dissipates through the lower openings 38, 52 and 54, replacement air enters the upper openings 37, 51, and 53. Thus, as a result of its structure, the panel 10 can effectively serve as an insulator to keep the interior of the panel 10 warmer as the ambient temperature drops.

Figure 9:
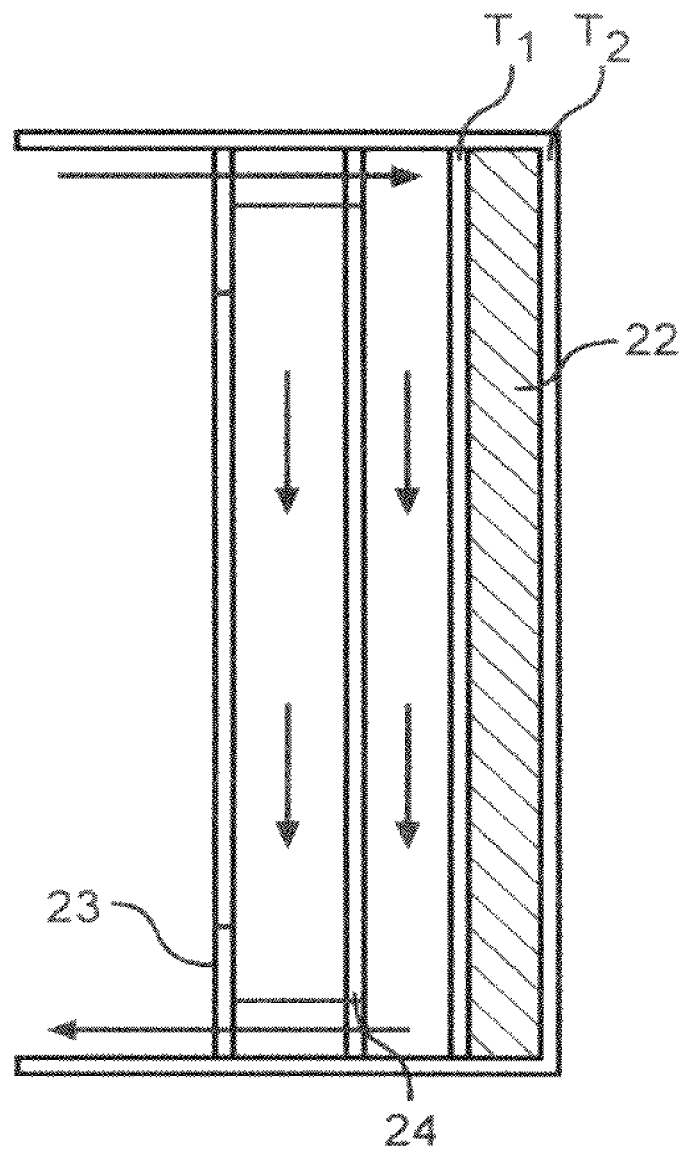
FIG. 9 is a side view of the insulating panel showing the temperature differential created by the panel.

The heat transfer principles of convection and conduction and Fourier's Law also explain how the insulating panel 10 is designed to prevent heat escape from a building to the outside atmosphere. As previously stated, Fourier's Law for calculating heat flux ($q''_x$):

$$q''_x = -K(T_2-T_1)/L$$

wherein $T_1$ is the temperature of the air adjacent an outside surface of the inner layer 22, $T_2$ is the air temperature adjacent an inside surface of the inner layer 22, K is the thermal conductivity of air, and L is the thickness of the layer. With reference to FIG. 9, since the openings in the outer panel 23 and the intermediate panel 24 allow air to circulate through the panel 10, convection currents keep the decreasing ambient temperature away from $T_1$ for an extended period of time. Accordingly, the rate of heat transfer will not increase for that period of time, and the panel 10 effectively maintains the interior temperature $T_2$.

Further, as also stated above, the panels 10 are not only useful as wall panels, but the panels 10 may be used as finished roofing components, girder panels, and the like. FIG. 10 illustrates a building constructed out of insulating panels 10. The panels 10W form the walls of the building, and the insulating panels 10R form the roof. As shown in FIG. 10, the ambient air enters the tops of the panels 10W and 10R and exits the bottoms of the panels 10W to 10R in furtherance of the heat transfer phenomena set forth above.

As described, it is a primary object of the invention to provide heat dissipating insulation panels that can be selectively constructed to exhibit differing heat convection and conduction characteristics depending upon the anticipated use and the environment in which the panels are to be used such that the number of layers may be varied to optimize fire protection or to protect from solar heating or to reduce internal heat dissipation by radiation and/or convection to the surrounding environment. The panels 10 of the invention can also be used as a means to protect against building and structure fires. With reference to FIGS. 11A-C, the panels 10 are shown installed in a multi-story building wherein they are used as interior wall components 10I and exterior wall components 10E and roofing components 10R. As is illustrated, if a fire occurs, the fire retardant intermediate layer 24 of each of the panels 10 will resist the spread of flames while the air layer 30 will conduct heat throughout the structure and to the exterior walls and roof to distribute the heat to thereby dissipate heat from the area of the fire as quickly as possible to minimize damage to structural components.

FIG. 11A shows a building constructed with insulating panels 10 when a fire first starts. The green color indicates a normal temperature for the building interior, while the orange color depicts warm air that is heated by the fire. As the fire grows, the air near the fire becomes hot, as shown by the red color in FIG. 11B. The heated air rises and exits through openings in the insulating roof panels 10R, and ambient air enters the building through openings in the exterior panels 10E, as shown by the yellow color in FIG. 11C. As a result of the panels in the roof, exterior walls, and interior walls, the hot air heated by the fire can be effectively conducted out of the building.

Figure 12A:
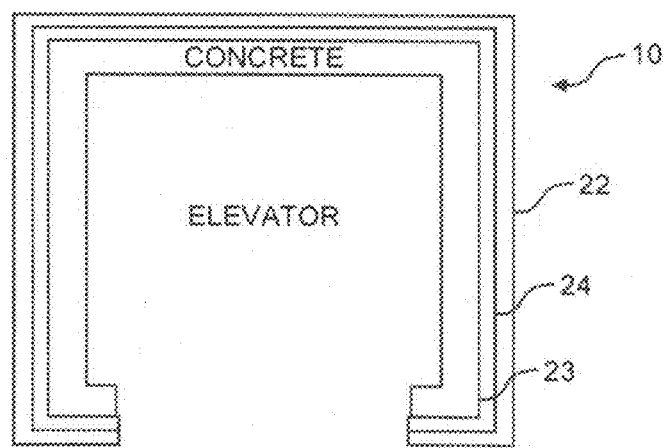
FIG. 12A is a top elevational view showing an exterior of an elevator shaft lined with insulating panels.

In addition to lining walls and roofs of a structure or building, the panels 10 of the invention can also be used in elevator shafts to protect against fires therein. With reference to FIG. 12A, the panels 10 are shown installed around the concrete walls of an elevator shaft. While the panels 10 are shown attached to the exterior of the shaft, the panels can likewise be attached to the interior of the shaft, as well as to both the interior and exterior of the shaft.

Figure 12B:
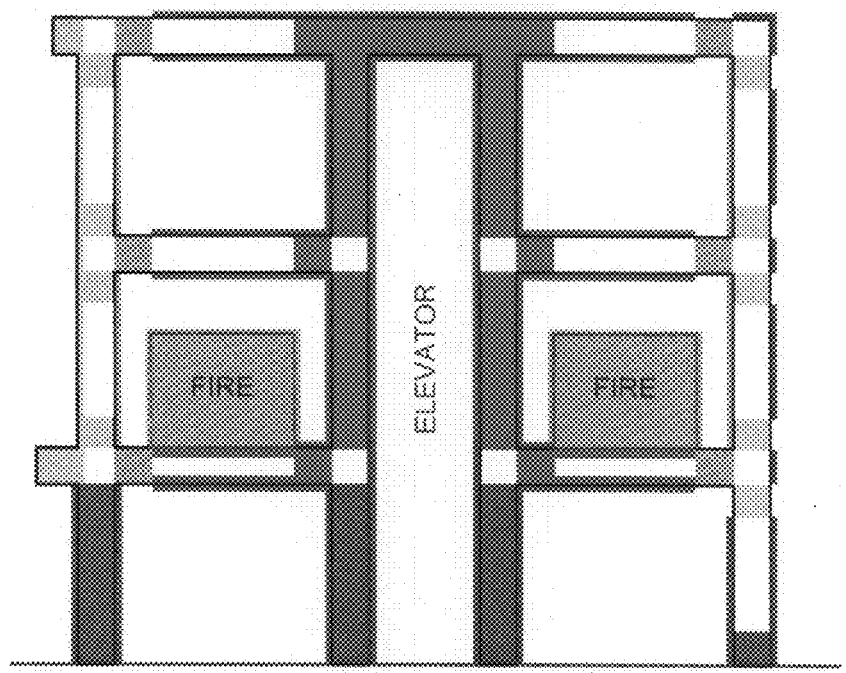
FIG. 12B is an illustrational view showing air flow caused by a fire in a multistory building with an elevator shaft constructed with insulating panels.

When a fire is located in a building with at least one elevator shaft, the hot air heated by the fire is exhausted through the upper openings in the panels 10, while ambient air enters the building through the lower openings in the panels 10, as shown in FIG. 12B. To enhance this flow of air, the panels 10 can be equipped with fans. Further, the green areas of FIG. 12B represent areas of normal interior temperature, and the red areas depict hot air that is heated by the fire. The yellow areas represent outside atmospheric air that enters the building, and the orange areas are areas where the atmospheric air is mixed with the hot air. Thus, as illustrated by FIG. 12B, the panels 10 can effectively channel hot air heated by a fire outside of a building to protect the building against fire damage.

Figure 8:
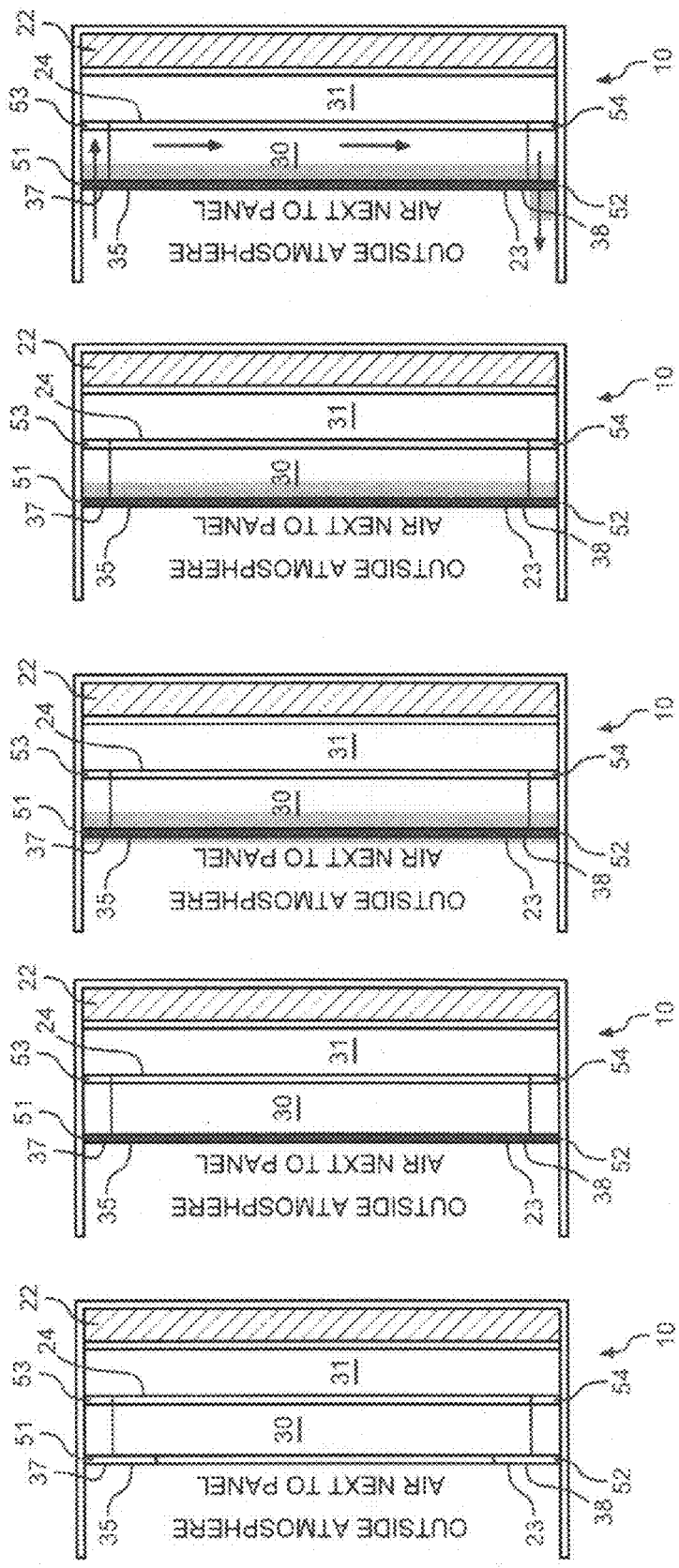
FIGS. 8A-E are side views of the insulating panel showing how the panels prevents heat escape as ambient temperature decreases.

While the insulating panels 10, as described above, provide an effective means of insulation and heat dissipation for a structure, the panels 10 may also include additional features to prolong their structural integrity and efficacy. For example, to further prevent moisture from entering the openings in the intermediate layer 24, the outer layer 23, and the covering material 35, the panels 10 may include horizontally extending moisture diverting flanges 80 along the upper portion 16 and above the upper openings 37 and flanges 81 above the lower openings 38, as shown in FIG. 2. In buildings having a roof peak, protective rain caps 82 may be installed at the joint between abutting roofing panels, as shown in FIGS. 8 and 10.

Further, in an alternative design, the panel can only include two layers. In such an embodiment, the panel 10 includes an inner imperforate rigid layer 22 of a first material and an outer generally imperforate and rigid layer 23 of a second material. The inner rigid layer 22 and outer rigid layer 23 are positioned in a spaced relationship so that there is an air space 30 between them. Further, at least one pair of upper and lower openings 51 and 52, respectively, are provided in the outer rigid layer 23 adjacent the upper and lower portions 16 and 17, respectively, of the panel 10. The upper and lower openings 51 and 52, respectively, in the outer layer 23 communicate with the air space 30 so that the air space 30 is in fluid communication with the ambient air outside the panel 10.

The panels 10 may also include valves 90 in the upper and lower openings to promote one-way air flow through the panels 10, as shown in FIGS. 13A-B. Preferably, the valves 90 each includes a swivel flap 91 and pivots about a central axle 92 located within an opening in a layer of the panel 10. The opening of the panel 10 is also equipped with rubber pads 93 to create a seal between an edge of the opening and an end of the swivel flap 92 of each valve 90. Further, a wedge 94 is used to lock the valve in a generally fixed position, depending on desired direction of air flow through the panel 10.

FIG. 13A shows the positions of the valves 90 in a panel 10 during a summer. A lower valve 90 is locked in an open position for allowing air to flow through the lower valve 90, while an upper valve 90 is unlocked. As the ambient temperature increases during the day, warmed air rises from the bottom of the panel 10 and exits through the unlocked upper valve 90 at the top of the panel 10 as ambient air enters through the open lower valve 90. As a result, the panel 10 serves to insulate an interior of a structure from the increasing ambient temperatures.

When the outside atmosphere temperature drops in the evening, the cooled air moves downwardly within the panel 10. The downward movement of air creates a pressure differential within the panel 10, which causes the upper valve 90 to close to prevent the entry of ambient air through the upper valve 90. Once the upper valve 90 is closed, the cooled air will not move downwardly and is contained within the panel 10. Since the air within the panel 10 is static, the panel 10 no longer acts as insulation. As a result, the temperatures of the air in the panel 10 and the interior of the structure will balance and cool the interior of the structure.

Similarly, FIG. 13B illustrates the positions of the valves 90 in a panel 10 during a winter. A lower valve 90 is in an unlocked position, and an upper valve 90 is locked in an open position for allowing air to flow through the upper valve 90. As the ambient temperature decreases during the evening, cooled air sinks from the top of the panel 10 and exits through the unlocked lower valve 90 at the bottom of the panel 10 as ambient air enters through the upper valve 90. As a result, the panel 10 serves to insulate an interior of a structure from the decreasing ambient temperatures.

When the outside atmosphere temperature increases during the afternoon, warmed air moves upwardly within the panel 10. The upward movement of air creates a pressure differential within the panel 10, which causes the lower valve 90 to close to prevent the entry of ambient air through the lower valve 90. Once the lower valve 90 is closed, the warmed air will not move upwardly and is contained within the panel 10. Since the air within the panel 10 is static, the panel 10 no longer acts as insulation. As a result, the temperatures of the air in the panel 10 and the interior of the structure will balance and warm the interior of the structure.

In addition to improving the insulating and heat dissipation properties of buildings by using the panels 10, existing building panels, beams, elevator shafts, girders, joists, posts, and the like can be retrofitted to provide the same beneficial properties as the panels 10. To retrofit an existing building structure, the outer rigid layer 23 can be secured in a spaced relationship to the outer surface of the existing building structure so that the space 30 exists between the outer layer 23 and the outer surface of the existing structure.

Thus, when the ambient temperature increases, the exterior surface of the outer rigid layer 23 starts to get warm. As the temperature of the outer layer 23 continues to increase, a layer of air adjacent to the outer layer 23 in the space 30 gets warm via conduction and convection. The warmer air in the space 30 rises and moves upwardly within the space 30. The warmer air continues to rise until it exits via the upper openings 51 in the outer panel 23.

Further, when the ambient temperature decreases, the exterior surface of the outer rigid layer 23 starts to get colder. As the temperature of the outer layer 23 continues to drop, a layer of air adjacent to the inner surfaces of the outer layer 23 in the space 30 gets colder. As the layer of air in the space 30 decreases in temperature, the cooler air in the space 30 sinks and moves downwardly within the space 30. The cooler air continues to sink until it exits via the lower openings 52 in the outer panel 23.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. An insulation panel comprising:
   an inner layer of a first material having an inner surface and an opposing outer surface,
   an outer layer of a second material having an inner surface and an opposing outer surface, said inner surface of said outer layer facing toward said outer surface of said inner layer,
   at least one intermediate rigid layer of a third material having an inner surface and an opposing outer surface, said inner surface of said at least one intermediate layer facing toward said outer surface of said inner layer, said outer surface of said at least one intermediate layer facing toward said inner surface of said outer layer, said at least one intermediate layer being positioned in a spaced relationship with said inner layer and with said outer layer so a first air space is formed between said inner surface of said outer layer and said outer surface of said at least one intermediate layer and a second air space is formed between said inner surface of said at least one intermediate layer and said outer surface of said inner layer,
   upper and lower plates extending generally transversely to said inner and outer surfaces of each of said inner layer, said outer layer, and said at least one intermediate layer such that said upper plate seals an upper end of each of said first and second air spaces and said lower plate seals a lower end of each of said first and second air spaces,
   at least one upper and at least one lower first openings in upper and lower portions of said outer layer so said first air space is in open communication with ambient air so as to permit airflow between said at least one upper and lower openings and thereby create heat exchange between said inner surface of said outer layer and said outer surface of said at least one intermediate layer and the ambient air as ambient air passes through said at least one upper and lower openings and flows along said first air space due at least to convection,
   wherein said inner layer is imperforate so air cannot flow through said inner layer, and wherein said at least one intermediate layer is imperforate so air cannot flow through said at least one intermediate layer such that said second air space is not in communication with said inner surface of said inner layer and said first air space,
   at least one upper and at least one lower second openings in said at least one intermediate layer so that said inner surface of said at least one intermediate layer and said outer surface of said inner layer are in an open heat exchange relationship with ambient air flowing through said second air space between said inner layer and said at least one intermediate layer.

2. The insulating panel of claim 1, further comprising a plurality of spaced attachment grills secured to a rear surface of the panel.

3. The insulating panel of claim 2, wherein said grills are mounted along upper, lower, and at least one intermediate portion of said inner layer.

4. The insulating panel of claim 1, including at least two pairs of first and second openings in said outer layer and said at least one intermediate layer, respectively.

5. The insulating panel of claim 1, further comprising a covering material that covers and extends along said outer surface of said outer layer.

6. The insulating panel of claim 5, further comprising at least one upper and lower third openings in said covering material that cooperate with at least one upper and lower first openings so that said first air space communicates with ambient air.

7. The insulating panel of claim 1, further comprising a first horizontally extending moisture diverting flanges along an upper portion of the panel and above the upper openings of said first upper and lower openings and a second horizontally extending moisture diverting flange located above the lower openings of said first upper and lower openings.

8. The insulating panel of claim 1, wherein said first, second and third materials are each made from glass, metals, plastics and plastic resins, graphite, ceramics, wooden, cementitious materials, or combinations thereof.

9. The insulating panel of claim 8 wherein said at least one intermediate layer is formed of a fire retardant material.

10. The insulating panel of claim 1, wherein said inner layer is an enclosed box of gaseous material.

11. The insulating panel of claim 10, wherein said enclosed box includes at least one insert therein.

12. The insulating panel of claim 1, wherein said inner layer is made from a solid material and has a substantially greater cross sectional dimension than said outer layer and said at least one intermediate layer so that said inner layer is a load-bearing layer.

13. The insulating panel of claim 1, wherein said inner layer, said outer layer, and said at least one intermediate layer have at least one corrugated face for reinforcement.

14. The insulating panel of claim 1, wherein a first side edge of the panel includes a male portion and a second side edge of the panel includes a female portion that is capable of interlocking with said male portion.

15. The insulating panel of claim 1, wherein a first side edge of the panel includes a vertically extending locking projection having opposite oriented side flanges extending from a front face thereof and a second side edge of the panel includes a clip member having a profile that cooperates with said vertically extending locking member.

16. The insulating panel of claim 1, wherein at least one intermediate layer is formed of a fire retardant material.

17. The insulating panel of claim 1, wherein at least one of said upper and lower first openings in said outer rigid layer includes a valve.

* * * * *